(12) United States Patent
Nilsson et al.

(10) Patent No.: US 9,143,806 B2
(45) Date of Patent: Sep. 22, 2015

(54) VIDEO CODING

(75) Inventors: Mattias Nilsson, Sundbyberg (SE); Renat Vafin, Tallinn (EE); Soren Vang Andersen, Esch-sur-Alzette (LU)

(73) Assignee: Skype, Dublin (IE)

( * ) Notice: Subject to any disclaimer, the term of this patent is extended or adjusted under 35 U.S.C. 154(b) by 392 days.

(21) Appl. No.: 13/274,922

(22) Filed: Oct. 17, 2011

(65) Prior Publication Data

US 2012/0327997 A1   Dec. 27, 2012

(30) Foreign Application Priority Data

Jun. 24, 2011   (GB) .................................. 1110759.6

(51) Int. Cl.
*H04N 7/26* (2006.01)
*H04N 19/89* (2014.01)
*H04N 19/176* (2014.01)
*H04N 19/147* (2014.01)
*H04N 19/134* (2014.01)
(Continued)

(52) U.S. Cl.
CPC ............. *H04N 19/89* (2014.11); *H04N 19/102* (2014.11); *H04N 19/103* (2014.11); *H04N 19/134* (2014.11); *H04N 19/147* (2014.11); *H04N 19/166* (2014.11); *H04N 19/176* (2014.11); *H04N 19/19* (2014.11)

(58) Field of Classification Search
CPC . H04N 19/176; H04N 19/147; H04N 19/134; H04N 19/89; H04N 19/103; H04N 19/166; H04N 19/19; H04N 19/102
USPC ............ 375/240; 709/231; 382/236; 364/214
See application file for complete search history.

(56) References Cited

U.S. PATENT DOCUMENTS 6,097,897 A   8/2000   Ide
6,320,919 B1  11/2001  Khayrallah et al.
(Continued)

FOREIGN PATENT DOCUMENTS

CN   1759610   4/2006
CN   101162930  4/2008
(Continued)

OTHER PUBLICATIONS

"Search Report", GB Application No. 1110759.6, (Oct. 18, 2012), 3 pages.
(Continued)

*Primary Examiner* — Dave Czekaj
*Assistant Examiner* — Berteau Joisil
(74) *Attorney, Agent, or Firm* — Jim Ross; Micky Minhas (57) ABSTRACT

A video coding method includes for each target image portion to be encoded, selecting a preferred one of a set of encoding modes by optimizing a function comprising an estimate of distortion and a measure of bit rate required to encode the target image portion, the encoding modes comprising at least an intra frame mode and an inter frame mode; and transmitting the encoded video stream over a lossy channel. The estimate of distortion is based on a contribution from possible new loss over the channel comprising possible loss of the target block, and on a contribution from possible past loss over the channel comprising possible loss in a history of the encoded video stream upon which decoding of the target portion depends. The method includes accumulating the contribution from past loss over time, such that the estimate of distortion grows irrespective of the contribution from new loss.

26 Claims, 5 Drawing Sheets

(51) Int. Cl.
- *H04N 19/102* (2014.01)
- *H04N 19/103* (2014.01)
- *H04N 19/166* (2014.01)
- *H04N 19/19* (2014.01)

(56) References Cited

U.S. PATENT DOCUMENTS

| | | | |
|---|---|---|---|
| 6,683,988 B1 | 1/2004 | Fukunaga et al. | |
| 7,093,028 B1 | 8/2006 | Shao et al. | |
| 7,142,599 B2 | 11/2006 | Henocq | |
| 7,317,759 B1 | 1/2008 | Turaga et al. | |
| 8,180,915 B2 | 5/2012 | Zhao | |
| 8,457,202 B2 | 6/2013 | Wang et al. | |
| 8,804,836 B2 | 8/2014 | Nilsson et al. | |
| 8,908,761 B2 | 12/2014 | Nilsson et al. | |
| 9,036,699 B2 | 5/2015 | Vafin et al. | |
| 2002/0064228 A1* | 5/2002 | Sethuraman et al. | 375/240.12 |
| 2003/0012202 A1 | 1/2003 | Fukutomi | |
| 2003/0151513 A1 | 8/2003 | Herrmann et al. | |
| 2004/0114817 A1 | 6/2004 | Jayant et al. | |
| 2004/0228537 A1 | 11/2004 | Yeung et al. | |
| 2004/0264571 A1 | 12/2004 | Zhang et al. | |
| 2005/0053299 A1 | 3/2005 | Fuchs et al. | |
| 2005/0135484 A1 | 6/2005 | Lee et al. | |
| 2005/0213657 A1 | 9/2005 | Kodama et al. | |
| 2005/0237987 A1* | 10/2005 | Wang et al. | 370/342 |
| 2005/0265383 A1 | 12/2005 | Melpignano et al. | |
| 2006/0056338 A1 | 3/2006 | Abe et al. | |
| 2006/0098573 A1 | 5/2006 | Beer et al. | |
| 2006/0239348 A1 | 10/2006 | Zhang | |
| 2006/0291558 A1 | 12/2006 | Schreier | |
| 2007/0030894 A1 | 2/2007 | Tian et al. | |
| 2007/0160137 A1 | 7/2007 | Guo et al. | |
| 2007/0206673 A1 | 9/2007 | Cipolli et al. | |
| 2008/0089414 A1 | 4/2008 | Wang et al. | |
| 2008/0112481 A1 | 5/2008 | Hsaing et al. | |
| 2008/0247469 A1 | 10/2008 | Vadapalli et al. | |
| 2008/0310502 A1 | 12/2008 | Kim et al. | |
| 2008/0316364 A1 | 12/2008 | Au et al. | |
| 2009/0067495 A1 | 3/2009 | Au et al. | |
| 2009/0080518 A1 | 3/2009 | Au et al. | |
| 2009/0086816 A1 | 4/2009 | Leontaris et al. | |
| 2009/0086827 A1 | 4/2009 | Wu et al. | |
| 2009/0103635 A1 | 4/2009 | Pahalawatta | |
| 2009/0110062 A1 | 4/2009 | Au et al. | |
| 2009/0135901 A1 | 5/2009 | Au et al. | |
| 2009/0190661 A1 | 7/2009 | Nagori | |
| 2009/0219991 A1 | 9/2009 | Po et al. | |
| 2009/0252227 A1 | 10/2009 | NepomucenoLeung et al. | |
| 2010/0161329 A1 | 6/2010 | Chung et al. | |
| 2010/0226262 A1 | 9/2010 | Liu et al. | |
| 2010/0238997 A1 | 9/2010 | Yang et al. | |
| 2010/0239015 A1* | 9/2010 | Wang et al. | 375/240.16 |
| 2010/0278055 A1 | 11/2010 | Barry et al. | |
| 2010/0278275 A1 | 11/2010 | Yang et al. | |
| 2010/0303148 A1 | 12/2010 | Hiron | |
| 2010/0316126 A1 | 12/2010 | Chen et al. | |
| 2011/0080952 A1 | 4/2011 | Vadapalli et al. | |
| 2011/0090960 A1 | 4/2011 | Leontaris et al. | |
| 2011/0103480 A1 | 5/2011 | Dane | |
| 2011/0119565 A1 | 5/2011 | Chang et al. | |
| 2011/0150113 A1 | 6/2011 | Oyman et al. | |
| 2011/0164677 A1 | 7/2011 | Lu et al. | |
| 2011/0182356 A1 | 7/2011 | Ammu | |
| 2011/0206119 A1 | 8/2011 | Bivolarsky et al. | |
| 2011/0286516 A1 | 11/2011 | Lim et al. | |
| 2011/0310766 A1 | 12/2011 | Barry et al. | |
| 2012/0069927 A1 | 3/2012 | Oyman et al. | |
| 2012/0093017 A1 | 4/2012 | Liu et al. | |
| 2012/0121013 A1 | 5/2012 | Lainema et al. | |
| 2012/0327998 A1 | 12/2012 | Nilsson | |
| 2012/0328002 A1 | 12/2012 | Vafin | |
| 2013/0044804 A1 | 2/2013 | Nilsson | |
| 2013/0058394 A1 | 3/2013 | Nilsson | |
| 2013/0058395 A1 | 3/2013 | Nilsson | |
| 2013/0058405 A1 | 3/2013 | Zhao | |
| 2013/0223513 A1 | 8/2013 | Chen et al. | |
| 2013/0301660 A1 | 11/2013 | Barry et al. | |
| 2015/0071353 A1 | 3/2015 | Nilsson et al. | |

FOREIGN PATENT DOCUMENTS

| | | |
|---|---|---|
| CN | 101346999 | 1/2009 |
| CN | 101960466 | 1/2011 |
| EP | 1439712 | 7/2004 |
| EP | 2096874 | 9/2009 |
| EP | 2139138 | 12/2009 |
| EP | 2184925 | 5/2010 |
| EP | 2230849 | 9/2010 |
| GB | 2167267 | 5/1986 |
| GB | 2492329 | 1/2013 |
| JP | 10145794 | 5/1998 |
| WO | WO-2004004359 | 1/2004 |
| WO | WO-2006042323 | 4/2006 |
| WO | WO-2007015126 | 2/2007 |
| WO | WO-2007084475 | 7/2007 |
| WO | WO-2012171113 | 12/2012 |

OTHER PUBLICATIONS

"Search Report", GB Application No. 1110760.4, (Oct. 24, 2012), 4 pages.
"Search Report", GB Application No. 1110763.8, (Oct. 18, 2012), 3 pages.
"Search Report", GB Application No. 1114323.7, (Dec. 10, 2012), 3 pages.
"Search Report", GB Application No. 1115201.4, (Feb. 12, 2013), 3 pages.
"Search Report", GB Application No. 1115209.7, (Feb. 12, 2013), 3 pages.
"International Search Report and Written Opinion", Application No. PCT/US2012/053581, (Dec. 11, 2012), 14 pages.
"International Search Report and Written Opinion", Application No. PCT/US2012/053850, (Dec. 5, 2012), 12 pages.
"International Search Report and Written Opinion", Application No. PCT/US2012/053583, (Dec. 5, 2012), 13 pages.
"International Search Report and Written Opinion", Application No. PCT/US2012/051507, (Dec. 17, 2012), 13 pages.
Alwihaibi, Abdullah et al., "Computation of the Residual Packet Loss Probability in a Binary Multicast Tree", (2003), 4 pages.
Chen, Chih-Ming "Error Resilience Transcoding Using Prioritized Intra-Refresh for Video Multicast Over Wireless Networks", (2005), 4 pages.
Naghdinezhad, Amir et al., "Distortion Estimation for Reference Frame Modification Methods", *19th European Signal Processing Conference (EUSIPCO 2011)*, (2011), 5 pages.
Stockhammer, Thomas et al., "Rate-Distortion Optimization for JVT/H.26L Video Coding in Packet Loss Environment", *International Workshop on Packet Video*, 2002, (Apr. 24, 2002), 12 pages.
Vadapalli, Sarat C., "Low-Complexity Frame-Level Joint Source-Channel Distortion Optimal, Adaptive Intra Refresh", *2008 IEEE 10th Workshop on Multimedia Signal Processing*, (2008), pp. 474-480.
Vadapalli, Sarat C., et al., "Efficient Alternative to Intra Refresh Using Reliable Reference Frames", *International Conference on Multimedia and Expo, 2007 IEEE*, (2007), 4 pages.
Zhang, Yuan et al., "Joint Source-Channel Rate-Distortion Optimization for H.264 Video Coding Over Error-Prone Networks", (2007), pp. 445-454.
Zhang, Yuan et al., "Optimum End-to-End Distortion Estimation for Error Resilient Video Coding", (2004), 4 pages.
"International Search Report and Written Opinion", Application No. PCT/EP2012/062163, (Aug. 7, 2012), 15 pages.
"International Search Report and Written Opinion", Application No. PCT/EP2012/062164, (Jul. 30, 2012), 14 pages.
"International Search Report and Written Opinion", Application No. PCT/EP2012/062162, (Aug. 7, 2012), 17 pages.
Chao, Yi-Chih et al., "An Approximate Square Criterion for H.264/AVC Intra Mode Decision", *Multimedia and Expo. 2888 IEEE International Conference on. IEEE*. Piscataway. NJ. USA, (Jun. 23, 2008), pp. 333-336.

(56) References Cited

OTHER PUBLICATIONS

Chen, Quqing et al., "Attention-Based Adaptive Intra Refresh for Error-Prone Video Transmission", *video transmission, IEEE Communications Magazine, IEEE Service Center*, Piscataway, US, vo 1 . 44, No. 1, (Jan. 1, 2007), pp. 52-60.

Lim, Keng-Pang et al., "JM text: Description of Joint Model Reference Encoding Methods and Decoding Concealment Methods", *24. JVT Meeting; 81. MPEG Meeting; 29.6.2887-5.7.2886*; Geneva. CH;(*Joint Video Team of ISO/IEC JTC1/SC29/WG11 and ITU-T SG . 16*, (Jul. 3, 2007), 58 pages.

Liu, Meng et al., "Rate Control Based on Intermediate Description", *Visual Communications and Image Processing*; Jul. 11, 2010-Jul. 14, 2010; Huang Shan, An Hu I , China, (Jul. 11, 2012), 10 pages.

Nyamweno, S et al., "Error Resilient Video Coding Via Weighted Distortion", *Multimedia and Expo, 2009. ICME 2009. IEEE International Conference on, IEEE*, Piscataway, NJ, USA, (Jun. 28, 2009), pp. 734-737.

Rolin, Ruan "A Novel Intra Refreshment Algorithim for ROI", *Multimedia and Information Technology, 2008. MMIT '08. International Conference on, IEEE*, Piscataway, NJ, USA, (Dec. 30, 2008), pp. 62-65.

Sarwer, Mohammed G., et al., "Enhanced Low Complex Cost Function for H.264/AVC Intra Mode Decision", *Multimedia and Signal Processing (CMSP). 2811 International Conference on. IEEE*, (May 14, 2011), pp. 46-50.

Song, Mingzhou et al., "Motion Estimation in DCT Domain", *IEEE*, vol. 5, (1996), pp. 670-674.

Sullivan, Gary J., et al., "Rate-Distortion Optimization for Video Compression", *IEEE Signal Processing Magazine*, 15(6), (Nov. 1, 1998), pp. 74-90.

Wang, Yi et al., "Off-Line Motion Description for Fast Video Stream Generation in MPEG-4 AVC/H.264", *2006 IEEE International Conference on Multimedia and Expo (ICME 2006)*, Toronto, Ont., Canada, *IEEE*, Piscataway, NJ, USA, (Jul. 1, 2006), pp. 685-688.

Wiegand, Thomas et al., "Error Resilient Video Transmission Using Long-Term Memory Motion-Compensated Prediction", *IEEE Journal on Selected Areas in Communications*, IEEE Service Center, Piscataway, US, val. 18, No. 6, (Jun. 1, 2000), pp. 1050-1062.

Xiong, Bing et al., "A New Multiplication-Free Block Matching Criterion", *IEEE Transactions on Circuits and Systems for Video Technology*. IEEE Service Center. Piscataway. NJ. US. vo 1 . 18. No. 18, (Oct. 1, 2008), pp. 1441-1446.

Zhang, Yuan et al., "Error Resilience Video Coding in H.264 Encoder with Potential Distortion Tracking", *Image Processing, 2004. ICIP '04. 2004 International Conference on Singapore* Oct. 24-27, 2004, Piscataway, NJ, USA,*IEEE*, val. 1, (Oct. 24, 2004), pp. 163-166.

"Final Office Action", U.S. Appl. No. 13/274,881, Sep. 16, 2014, 43 pages.

"Foreign Office Action", CN Application No. 201210320553.6, Sep. 15, 2014, 16 pages.

"Foreign Office Action", CN Application No. 201210320556.X, Nov. 3, 2014, 13 pages.

"Non-Final Office Action", U.S. Appl. No. 13/275,046, Dec. 9, 2014, 28 pages.

Girod, et al., "Feedback-Based Error Control for Mobile Video transmission", Proceedings of the IEEE, 87 (10), Oct. 1999, 17 Pages.

Wiegand, et al., "Rate-Distortion Optimized Mode Selection for Very Low Bit Rate Video Coding and the Emerging H.263 Standard", IEEE Transactions on Circuits and Systems for Video Technology, vol. 6, No. 2., Apr. 1996, pp. 182-190.

"Foreign Office Action", CN Application No. 20120320325.9, Oct. 10, 2014, 18 pages.

"Notice of Allowance", U.S. Appl. No. 13/274,904, Dec. 22, 2014, 6 pages.

"Final Office Action", U.S. Appl. No. 13/274,865, Jul. 18, 2014, 24 pages.

"Final Office Action", U.S. Appl. No. 13/275,046, May 22, 2014, 22 pages.

"Non-Final Office Action", U.S. Appl. No. 13/274,881, Jul. 2, 2014, 37 pages.

"Non-Final Office Action", U.S. Appl. No. 13/274,904, Jun. 16, 2014, 32 pages.

"Notice of Allowance", U.S. Appl. No. 13/274,803, Jul. 30, 2014, 15 pages.

"Final Office Action", U.S. Appl. No. 13/274,881, Mar. 18, 2014, 32 pages.

"Non-Final Office Action", U.S. Appl. No. 13/274,739, Nov. 20, 2013, 14 pages.

"Non-Final Office Action", U.S. Appl. No. 13/274,865, Jan. 7, 2014, 24 pages.

"Non-Final Office Action", U.S. Appl. No. 13/274,881, Dec. 19, 2013, 29 pages.

"Non-Final Office Action", U.S. Appl. No. 13/274,904, Nov. 12, 2013, 25 pages.

"Non-Final Office Action", U.S. Appl. No. 13/275,046, Jan. 16, 2014, 21 pages.

"Notice of Allowance", U.S. Appl. No. 13/274,739, Jan. 9, 2014, 4 pages.

"Non-Final Office Action", U.S. Appl. No. 13/274,881, Mar. 6, 2015, 42 pages.

"Notice of Allowance", U.S. Appl. No. 13/275,046, May 8, 2015, 7 pages.

Harmanci,"A stochastic framework for rate-distortion optimized video coding over error-prone networks", IEEE Transactions on Image Processing, vol. 16 Issue 3, Mar. 2007, 14 pages.

Stoufs,"Scalable Joint Source-Channel Coding for the Scalable Extension of H.264/AVC", Circuits and Systems for Video Technology, Volume:18 Issue:12, Sep. 16, 2008, 14 pages.

"Non-Final Office Action", U.S. Appl. No. 13/274,865, Jun. 18, 2015, 27 pages.

"Foreign Office Action", CN Application No. 201210320325.9, Jun. 15, 2015, 7 pages.

\* cited by examiner

Frame $F_t$     FIG. 1c     Frame $F_{t+1}$

VIDEO CODING

RELATED APPLICATION

This application claims priority under 35 U.S.C. §119 or 365 to Great Britain Application No. GB 1110759.6, filed Jun. 24, 2011. The entire teachings of the above application are incorporated herein by reference.

TECHNICAL FIELD

The present invention relates to balancing a trade-off between bitrate and distortion when encoding a video signal using intra and inter frame encoding.

BACKGROUND

Figure 1A:
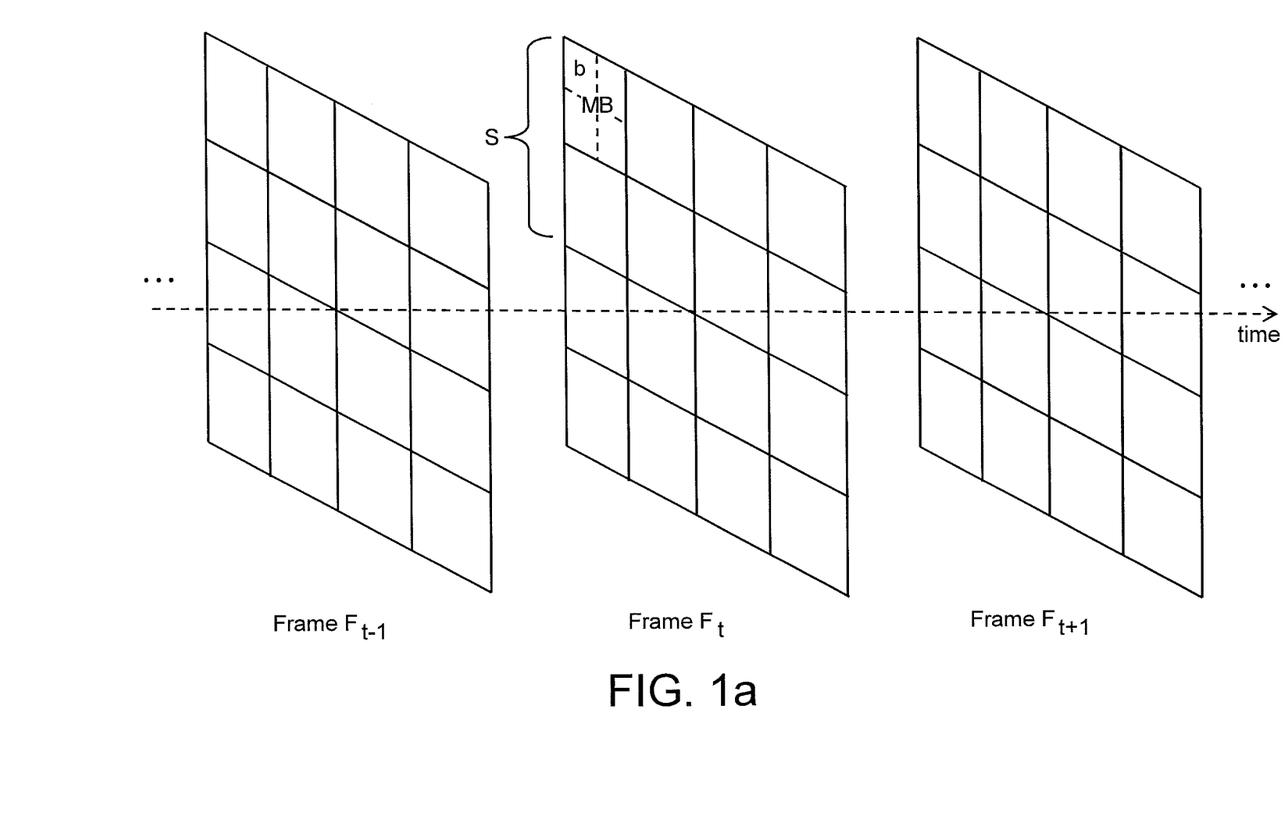
FIG. 1a is a schematic representation of a video stream.

A stream of video data to be encoded is illustrated schematically in FIG. 1a. The stream comprises multiple frames (F) each representing the video image at a different respective moment in time. As will be familiar to a person skilled in the art, for the purpose of encoding, each frame (F) is divided into portions and each portion may also be subdivided into smaller sub-portions, each portion or sub-portion comprising a plurality of pixels. For example, according to one terminology each frame of a video stream to be encoded is divided into macroblocks (MB) and each macroblock is subdivided into blocks (b), each block comprising multiple pixels. Each frame may also be divided into independently decodable slices (S), each slice comprising one or more macroblocks. N.B. the divisions shown in FIG. 1a are only schematic for illustrative purposes and it will be appreciated that these are not necessarily meant to correspond to any actual encoding scheme—e.g. each frame is likely to contain a larger number of macroblocks.

A goal of a video codec is to reduce the bit rate needed to transmit a video signal, while maintaining highest possible quality. This goal is achieved by exploiting statistical redundancies (similarities in the video signal) and perceptual irrelevancies (related to sensitivity of human visual system).

Most of today's video codecs are based on an architecture that includes prediction of pixel blocks from other pixel blocks, transform of prediction residuals, quantization of transform coefficients, and entropy coding of quantization indices. These steps contribute to reducing redundancies and irrelevancies.

The prediction typically can be done from pixels in video frames different from the current frame (inter prediction) and from pixels in the same frame (intra prediction). That is, if encoded using intra frame encoding then a block or portion of the frame (the target block or portion) is encoded relative to another block or image portion in the frame (the reference block or portion); and if encoded using inter frame encoding then the target block or portion is encoded relative to a reference block or portion in another frame. This process is commonly referred to as prediction or prediction coding. The inter or intra prediction module will thus generate a prediction e.g. in the form of an indication of a neighboring block in the case of intra frame encoding and/or a motion vector in the case of inter frame encoding. Typically the encoder also generates a residual signal representing a "left over" difference between the predicted block and the actual block. The intra prediction, motion vectors and residual are then output into the encoded video stream, typically via further coding stages such as a quantizer and entropy encoder. Hence most blocks in the video can be encoded in terms of a difference between blocks, which requires fewer bits to encode than encoding absolute pixel values and hence saves on bitrate. Intra prediction encoding typically requires more bits than inter prediction, though still represents a saving over encoding absolute values. Details of suitable inter and intra encoding techniques for video will be familiar to a person skilled in the art.

Figure 1B:
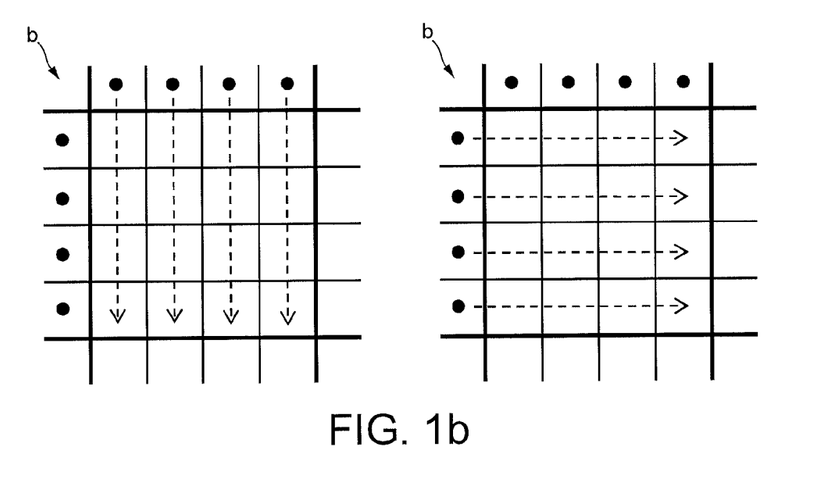
FIG. 1b is a schematic representation of some intra prediction coding modes.

Modern codecs allow the use of different prediction encoding modes for different portions within a frame. The possibility of having different coding options increases the rate-distortion efficiency of a video codec. The optimal coding representation has to be found for every frame region. Typically, such region is a macroblock, e.g. of 16×16 pixels. I.e. so it is possible for an intra prediction or inter prediction mode to be selected individually for each macroblock, so that different macroblocks within the same frame can be encoded with different modes. It is also possible in some codecs to use different modes based on different levels of partitioning of macroblocks, e.g. selecting between a higher complexity mode in which a separate prediction is performed for each 4×4 block within a macroblock or a lower complexity mode in which prediction is performed based on only 8×8 or 8×16 blocks or even whole macroblocks. The available modes may also include different options for performing prediction. For example as illustrated schematically in FIG. 1b, in one intra mode the pixels of a 4×4 block (b) may be determined by extrapolating down from the neighboring pixels from the block immediately above, or by extrapolating sideways from the block immediately to the left. Another special prediction mode called "skip mode" may also be provided in some codecs, which may be considered as an alternative type of inter mode. In skip mode (PSkip) the target's motion vector is inferred based on the motion vectors to the top and to the left and there is no encoding of residual coefficients. The manner in which the motion vector is inferred is consistent with motion vector prediction, and thus the motion vector difference is zero so it is only required to signal that the MB is a skip block.

A coding representation may thus include block partition information, prediction mode, motion vector, quantization accuracy, etc. The optimal coding option depends on video content, bit rate, earlier coding decisions, etc. The accuracy of quantization of transform coefficients is typically chosen to meet a bit rate constraint. Furthermore, distortion should be minimized.

For example, the H.264 video coder provides a great flexibility in choosing the prediction mode. For inter prediction of the luma component, a macroblock of 16×16 pixels can be represented as one block of 16×16 pixels, or two blocks of 16×8 pixels, or two blocks of 8×16 pixels, or four blocks of 8×8 pixels. Further, an 8×8 block can be represented as one block of 8×8 pixels, or two blocks of 8×4 pixels, or two blocks 4×8 pixels, or four blocks of 4×4 pixels. The inter prediction is tried for each allowed partition of a macroblock. The inter prediction of a block is represented by indexing the reference frame(s) and the motion vector(s) (spatial shift from the reference block in the respective reference frame), which typically are estimated with sub-pixel precision. For intra prediction of the luma component, there are four possible modes for 16×16 blocks and nine possible modes for 4×4 blocks. Further, there are four possible modes for chroma components. The best prediction mode is chosen by comparing the performance of inter and intra prediction modes.

The rate-distortion performance of a video codec such as H.264 AVC depends to a large extent on the performance of the macroblock mode selection o. That is, the procedure of determining whether the macroblock is best encoded, in terms of rate-distortion trade-offs, using e.g. intra mode or inter mode (predicted from previously encoded frame). From a robustness perspective, intra coded macroblocks are beneficial since they stop temporal error propagation (assuming the use of constrained intra prediction, i.e. intra prediction from inter predicted macroblocks is prohibited). However, intra coded macroblocks are generally more expensive in terms of rate compared to inter coded macroblocks, and thus it is important to introduce intra coded macroblocks systematically such that the distortion (e.g. average distortion) at the decoder is minimized given a certain bit budget and channel condition. Zhang et al., "Error resilience video coding in H.264 encoder with potential distortion tracking", (Proc. IEEE International Conference on Image Processing, pp. 163-166, 2004) (incorporated herein by reference in its entirety) propose such a systematic framework to introduce intra coded macroblocks based on the minimization of the expected average sum of squared differences (SSD) at the decoder. By tracking the potential distortion Zhang et al are able to compute a bias term related to the expected error-propagation distortion (at the decoder) that is added to the source coding distortion when computing the cost for inter macroblocks within the encoder rate-distortion loop.

The rate-distortion performance optimization problem can be formulated in terms of minimizing distortion under a bit rate constraint R. A Lagrangian optimization framework is often used to solve the problem. There, the optimization criterion is formulated as $$J = D(m,o) + \lambda R(m,o), \quad (1)$$

where J represents the Lagrange function, D represents a measure of distortion (a function of mode o and macroblock m or macroblock sub-partition), R is the bitrate, and $\lambda$ is a parameter defining a trade-off between distortion and rate. Commonly used distortion measures are sum of squared differences (SSD) between original and reconstructed pixels or sum of absolute differences (SAD) between the original and predicted residual.

In this application solving the Largrangian optimization problem means finding the encoding mode o which minimizes the Lagrange function J, where the Lagrange function J comprises at least a term representing distortion, a term representing bitrate, and a factor (the "Lagrange multiplier") representing a tradeoff between the two. As the encoding mode o is varied towards more thorough or better quality encoding modes then the distortion term D will decrease. However, at the same time the rate term R will increase, and at a certain point dependent on $\lambda$ the increase in R will outweigh the decrease in D. Hence the expression J will have some minimum value, and the encoding mode o at which this occurs is considered the optimal encoding mode.

In this sense the bitrate R, or rather the term $\lambda$R, places a constraint on the optimization in that this term pulls the optimal encoding mode back from ever increasing quality. The mode at which this optimal balance is found will depend on $\lambda$, and hence $\lambda$ may be considered to represent a tradeoff between bitrate and distortion.

The Lagrangian optimization is commonly used in the process of choosing coding decisions, and is applied for every frame region (e.g. every macroblock of 16×16 pixels). Commonly, the distortion may be evaluated to account for all processing stages. These include prediction, transform, and quantization. Furthermore, in order to compute reconstructed pixels, steps of inverse quantization, inverse transform, and inverse prediction must be performed. SSD is often preferred as distortion criterion since it results in higher quality compared to SAD. Commonly, the rate also accounts for coding of all needed parameters, including parameters describing prediction and quantized transform coefficients.

In Zhang et al, the authors estimate the potential distortion in the decoder due to source coding and channel errors. The estimated potential distortion is then indirectly used to bias the mode selection towards intra coding (if there is a probability of channel errors).

Zhang's so-called end-to-end distortion expression is based on the sum of squared differences (SSD) distortion measure and assumes a Bernoulli distribution for losing macroblocks. The optimal macroblock mode $o_{opt}$ is given by:

$$o_{opt} = \mathrm{argmin}_o(D_s(m, o) + D_{ep-ref}(m, o) + \lambda R(m, o)), \quad (2)$$

where $D_s(m,o)$ denotes the SSD distortion between the original and reconstructed pixel block for macroblock in and macroblock mode o, R the total rate, and $\lambda$ the Lagrange multiplier relating the distortion and the rate term. $D_{ep-ref}(m,o)$ denotes the expected distortion within the reference block in the decoder due to error propagation. $D_{ep-ref}(m,o)$ thus provides a bias term which bias the optimization toward intra coding if error propagation distortion becomes too large. $D_{ep-ref}(m,o)$ is zero for the intra coded macroblock modes. The expression $D_s(m,o)+D_{ep-ref}(m,o)+\lambda R(m,o)$ may be considered an instance of a Lagrange function J. Argmin$_o$ outputs the value of the argument o for which the value of the expression J is minimum.

In Zhang et al. the $D_{ep-ref}(m,o)$ follows the motion of the objects and is calculated from a total distortion map using the current motion vectors. The total expected error propagation distortion map $D_{ep}$ is driven by the performance of the error concealment and is updated after each macroblock mode selection as:

$$D_{ep}(m(k),n+1) = (1-p)D_{ep-ref}(m(k),n,o_{opt}) + \\ p(D_{ec-rec}(m(k),n,o_{opt}) + D_{ec-ep}(m(k),n)), \quad (3)$$

where n is the frame number, m(k) denotes the $k^{th}$ sub-partition (i.e. block) of macroblock m, p the probability of packet loss, $D_{ec-rec}$ denotes the SSD between the reconstructed and error concealed pixels in the encoder, and $D_{ec-ep}$ the expected SSD between the error concealed pixels in the encoder and decoder.

SUMMARY

A problem with the algorithm in Zhang et al. is that it does not take into account the impact of a potential distortion into the future. From a perceptual point of view the duration of an error is an important factor, and the inventors believe that even a small but persistent potential expected error propagation distortion should eventually trigger a selection of intra coding mode.

According to one aspect of the invention, there is provided a method of encoding a video stream comprising a plurality of frames, each frame comprising a plurality of image portions, the method comprising: for each target image portion to be encoded, selecting a preferred one of a set of encoding modes by optimizing a function comprising an estimate of distortion and a measure of bit rate required to encode the target image portion, the encoding modes comprising at least (i) an intra frame mode which encodes the target image portion relative to a reference image portion in the same frame, and (ii) an inter frame encoding mode which encodes the target image portion relative to a reference image portion in a previously encoded frame; encoding the target image portion into the encoded video stream using the selected encoding mode; and transmitting the encoded video stream over a lossy channel;

wherein the estimate of distortion is based on a contribution from a contribution from possible new loss over the channel comprising possible loss of the target block, and on a contribution from possible past loss over the channel comprising possible loss in a history of the encoded video stream upon which decoding of the target portion depends; and the method comprises accumulating the contribution from past loss over time, such that the estimate of distortion grows irrespective of the contribution from new loss.

The invention will therefore tip the optimization towards intra coding in circumstances where a prior estimation such as Zhang et al. would have resulted in continued selection of the inter encoding mode. The invention thus provides a better trade-off between rate and distortion, and so a more robust real-time video encoding.

In embodiments the estimate of distortion may comprise a first term representing source coding distortion, and a bias term representing an estimate of distortion that would be experienced due to loss over said channel, the bias term being based on said contributions from possible new and past loss.

The bias term may be based on a second term representing an estimate of the distortion that would be experienced, if the target portion does arrive over the channel, due to non arrival of a reference portion in the target portion's history from which prediction of the target portion depends, and on a concealment term representing an estimate of distortion that would be experienced due to concealment; and said accumulation may comprise applying a temporal integration factor to the second term.

The concealment term may comprise a third term representing a measure of concealment distortion of the target portion relative to an image portion that would be used to conceal loss of the target portion if the target portion is lost over the channel, and a fourth term representing an estimate of distortion that would be experienced due to loss of an image portion in the target portion's history upon which concealment of the target portion depends.

The contribution from new loss may result from the third term and fourth term, and the contribution from past loss may result from the second term and fourth term.

The method may comprise determining a probability p that a packet will be lost over the channel, wherein the second term may be weighted by a factor of 1−p, the concealment term may be weighted by a factor of p, and the second term may be further weighted by the temporal integration factor such that the second term may be weighted by a combined factor greater than 1−p.

The bias term may be based on an entry in an error propagation distortion map comprising said second term and concealment term, and the method may comprise: updating the error propagation distortion map after each encoding mode selection, and determining the error propagation bias term from the error propagation distortion map for use in each respective subsequent encoding mode selection.

The selected encoding mode $o_{opt}$ may be calculated by:

$$o_{opt} = \operatorname*{argmin}_{o}(D_s(m, o) + D_{ep-ref}(m, o) + \lambda R(m, o)),$$

where $D_s(m,o) + D_{ep-ref}(m,o) + \lambda R(m,o)$ is said function, $D_s$ is the first term, $D_{ep-ref}(m,o)$ is the bias term, $R(o)$ is the bitrate, $\lambda$ is a factor representing a trade-off between distortion and bitrate, and m is an index of the target image portion.

The updated distortion map $D_{ep}$ for a frame n+1 may be configured so as to tend towards:

$$D_{ep}(n+1) = \alpha D_{ep}(n)$$

as the contribution from new loss tends towards zero, where $\alpha$ is the temporal integration factor, and n is a previously encoded frame for which the distortion map has already been determined.

The distortion map may be calculated according to:

$$D_{ep}(m(k),n+1) = \alpha(1-p)D_{ep-ref}(m(k),n,o_{opt}) + p(D_{ec-rec}(m(k),n,o_{opt}) + D_{ec-ep}(m(k),n))$$

where m(k) is the $k^{th}$ partition of the $m^{th}$ image portion, $D_{ep-ref}$ is the second term, $D_{ec-rec}$ is the third term, and $D_{ec-ep}$ is the fourth.

The set of encoding modes may comprise a skip mode.

The set of encoding modes may comprise modes using different sub-partitions of the target image portion for at least one of intra and inter frame encoding.

According to another aspect of the present invention, there is provided a computer-program product for encoding a video stream comprising a plurality of frames, each frame comprising a plurality of image portions, the computer program product being embodied on a non-transitory computer-readable medium and comprising code which when executed on a processor to perform the operations of: for each target image portion to be encoded, selecting a preferred one of a set of encoding modes by optimizing a function comprising an estimate of distortion and a measure of bit rate required to encode the target image portion, the encoding modes comprising at least (i) an intra frame mode which encodes the target image portion relative to a reference image portion in the same frame, and (ii) an inter frame encoding mode which encodes the target image portion relative to a reference image portion in a previously encoded frame; encoding the target image portion into the encoded video stream using the selected encoding mode; and transmitting the encoded video stream over a lossy channel; wherein the estimate of distortion is based on a contribution from possible new loss over the channel comprising possible loss of the target block, and on a contribution from possible past loss over the channel comprising possible loss in a history of the encoded video stream upon which decoding of the target portion depends; and the program is further configured so as when executed to accumulate the contribution from past loss over time, such that the estimate of distortion grows irrespective of the contribution from new loss.

In embodiments the computer program may be further configured so as when executed to perform operations in accordance with any of the above method features.

According to another aspect of the present invention, there is provided an apparatus for encoding a video stream comprising a plurality of frames, each frame comprising a plurality of image portions, the apparatus comprising: an encoder configured, for each target image portion to be encoded, to select a preferred one of a set of encoding modes by optimizing a function comprising an estimate of distortion and a measure of bit rate required to encode the target image portion, the encoding modes comprising at least (i) an intra frame mode which encodes the target image portion relative to a reference image portion in the same frame, and (ii) an inter frame encoding mode which encodes the target image portion relative to a reference image portion in a previously encoded frame; wherein the encoder is configured to encode the target image portion into the encoded video stream using the selected encoding mode; the apparatus further comprises a transmitter for transmitting the encoded video stream over a lossy channel; the estimate of distortion is based on a contribution from possible new loss over the channel comprising possible loss of the target block, and on a contribution from possible past loss over the channel comprising possible loss in a history of the encoded video stream upon which decoding of the target portion depends; and the encoder is further configured to accumulate the contribution from past loss over time, such that the estimate of distortion grows irrespective of the contribution from new loss.

In embodiments the encoder may be further configured to perform operations in accordance with any of the above method claims.

BRIEF DESCRIPTION OF THE DRAWINGS

For a better understanding of the present invention and to show how it may be put into effect, reference is made by way of example to the accompanying drawings in which.

DETAILED DESCRIPTION

Figure 2:
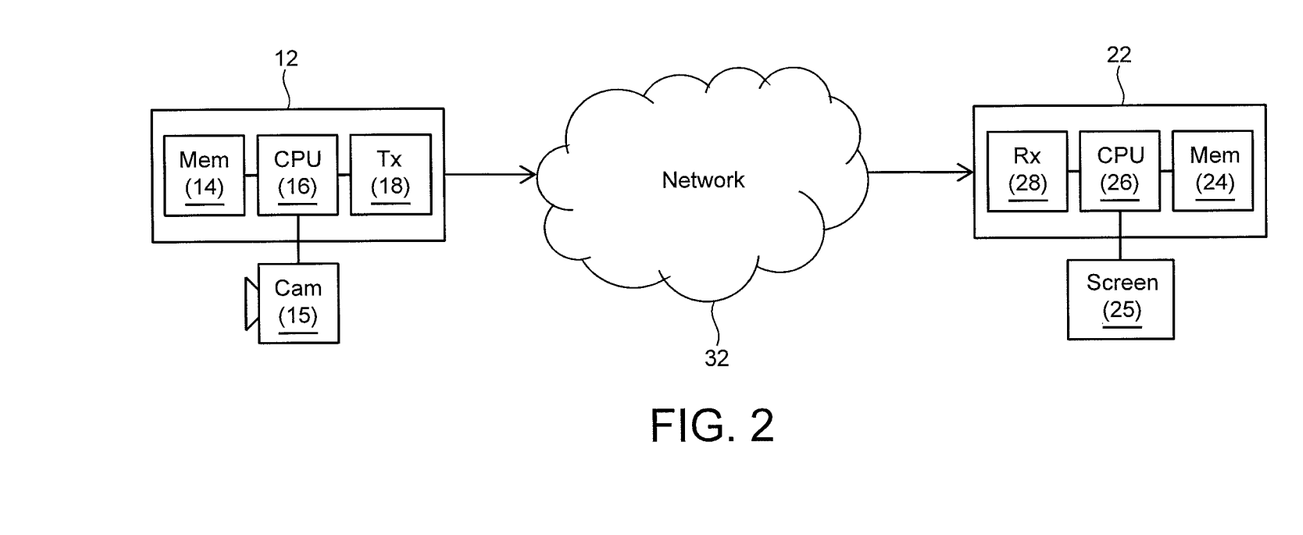
FIG. 2 is a schematic block diagram of a communication system.

An example communication system in which video coding may be employed is illustrated schematically in the block diagram of FIG. 2. The communication system comprises a first, transmitting terminal 12 and a second, receiving terminal 22. For example, each terminal 12, 22 may comprise a mobile phone or smart phone, tablet, laptop computer, desktop computer, or other household appliance such as a television set, set-top box, stereo system, etc. The first and second terminals 12, 22 are each operatively coupled to a communication network 32 and the first, transmitting terminal 12 is thereby arranged to transmit signals which will be received by the second, receiving terminal 22. Of course the transmitting terminal 12 may also be capable of receiving signals from the receiving terminal 22 and vice versa, but for the purpose of discussion the transmission is described herein from the perspective of the first terminal 12 and the reception is described from the perspective of the second terminal 22. The communication network 32 may comprise for example a packet-based network such as a wide area internet and/or local area network, and/or a mobile cellular network.

The first terminal 12 comprises a storage medium 14 such as a flash memory or other electronic memory, a magnetic storage device, and/or an optical storage device. The first terminal 12 also comprises a processing apparatus 16 in the form of a CPU having one or more cores; a transceiver such as a wired or wireless modem having at least a transmitter 18; and a video camera 15 which may or may not be housed within the same casing as the rest of the terminal 12. The storage medium 14, video camera 15 and transmitter 18 are each operatively coupled to the processing apparatus 16, and the transmitter 18 is operatively coupled to the network 32 via a wired or wireless link. Similarly, the second terminal 22 comprises a storage medium 24 such as an electronic, magnetic, and/or an optical storage device; and a processing apparatus 26 in the form of a CPU having one or more cores. The second terminal comprises a transceiver such as a wired or wireless modem having at least a receiver 28; and a screen 25 which may or may not be housed within the same casing as the rest of the terminal 22. The storage medium 24, screen 25 and receiver 28 of the second terminal are each operatively coupled to the respective processing apparatus 26, and the receiver 28 is operatively coupled to the network 32 via a wired or wireless link.

The storage medium 14 on the first terminal 12 stores at least a video encoder arranged to be executed on the processing apparatus 16. When executed the encoder receives a "raw" (unencoded) input video stream from the video camera 15, encodes the video stream so as to compress it into a lower bitrate stream, and outputs the encoded video stream for transmission via the transmitter 18 and communication network 32 to the receiver 28 of the second terminal 22. The storage medium on the second terminal 22 stores at least a video decoder arranged to be executed on its own processing apparatus 26. When executed the decoder receives the encoded video stream from the receiver 28 and decodes it for output to the screen 25. A generic term that may be used to refer to an encoder and/or decoder is a codec.

Figure 3:
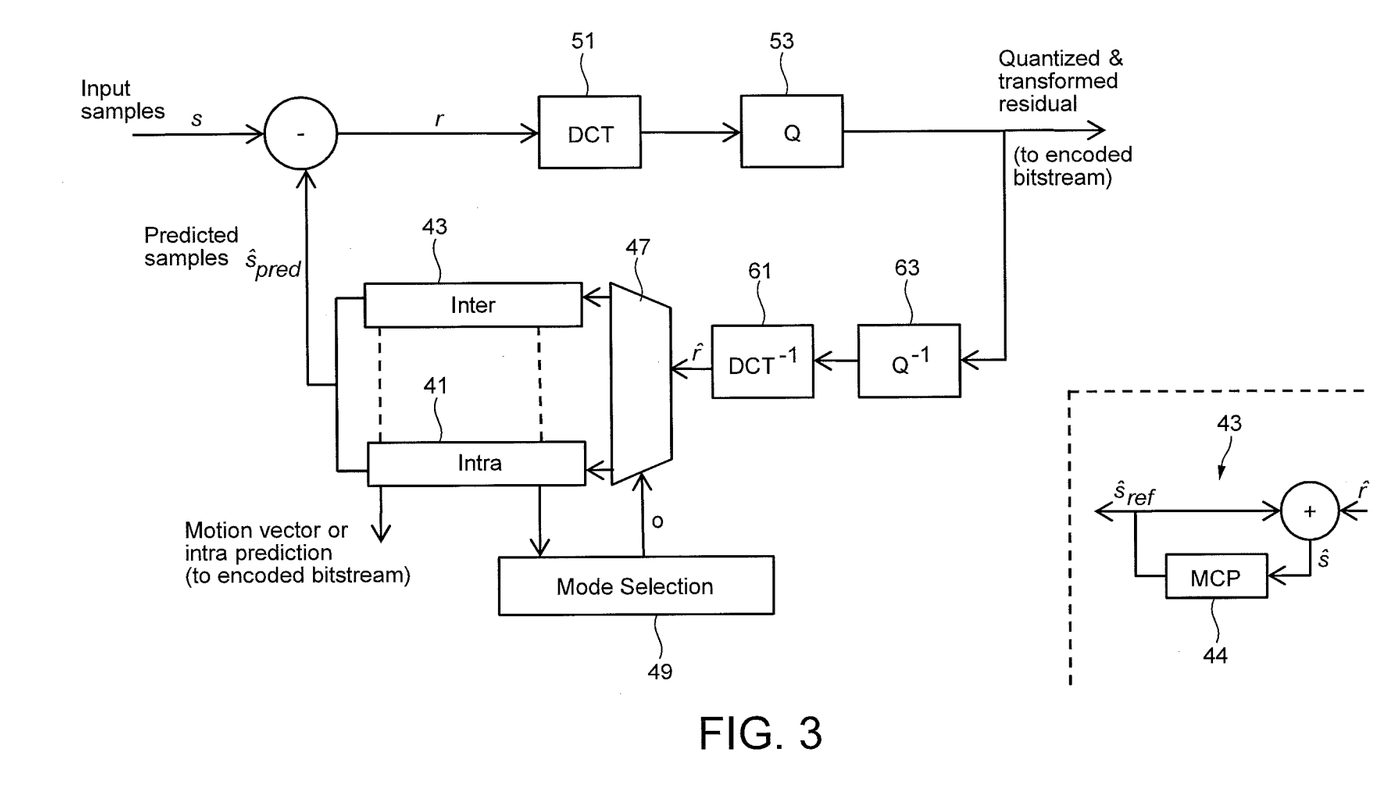
FIG. 3 is a schematic block diagram of an encoder.

FIG. 3 is a high-level block diagram schematically illustrating an encoder such as might be implemented on transmitting terminal 12. The encoder comprises: a discrete cosine transform (DCT) module 51, a quantizer 53, an inverse transform module 61, an inverse quantizer 63, an intra prediction module 41, an inter prediction module 43, and a subtraction stage (−). The encoder also comprises a switch 47 and mode selection module 49. Each of the modules or blocks is preferably implemented as a portion of code stored on the transmitting terminal's storage medium 14 and arranged for execution on its processing apparatus 16, though the possibility of some or all of these being wholly or partially implemented in dedicated hardware circuitry is not excluded.

Each of the switch 47 and mode selection module 49 is arranged to receive an instance of input video stream comprising a plurality of macroblocks MB. The mode selection module 49 is arranged to select a coding mode "o" for each macroblock and is operatively coupled to the multiplexer 47 so as to control it to pass the output of the inverse quantizer 63 to the input of either the intra prediction module 41 or inter prediction module 43 as appropriate to the selected mode. The mode selection module 49 may also be arranged to indicate the selected mode "o" to the relevant prediction module 41, 43 (e.g. to indicate a 4×4 partition mode, 8×8 mode, skip mode, etc). The output the intra prediction module 41 or inter prediction module 43 is then coupled on to an input of the subtraction stage (−) which is arranged to receive the unencoded input video stream at its other input and subtract the predicted blocks from their unencoded counterparts, thus generating the residual signal. The residual blocks are then passed through the transform (DCT) module 51 where their residual values are converted into the frequency domain, then to the quantizer 53 where the transformed values are converted to discrete quantization indices. The quantized, transformed signal is fed back though the inverse quantizer 63 and inverse transform module 61 to generate a predicted version of the blocks (as would be seen at the decoder) for use by the selected prediction module 41, 43. An indication of the predictions used in the prediction modules 41,43, the motion vectors generated by the inter prediction module 43 and the quantized, transformed indices of the residual as generated by the transform and quantization modules 51, 53 are all output for inclusion in the encoded video stream, typically via a further, lossless encoding stage such as an entropy encoder (not shown) where the prediction values and transformed, quantized indices may be further compressed using lossless encoding techniques known in the art.

As mentioned, a problem with the algorithm in Zhang et al. is that it does not take into account the impact of a potential distortion into the future, but according to the disclosure herein it is believed that even a small but persistent potential expected error propagation distortion should eventually trigger a selection of intra coding mode. In the following described embodiments it is exemplified how to include temporal integration into the expression of expected error-propagation distortion in order to facilitate this.

Figure 4:
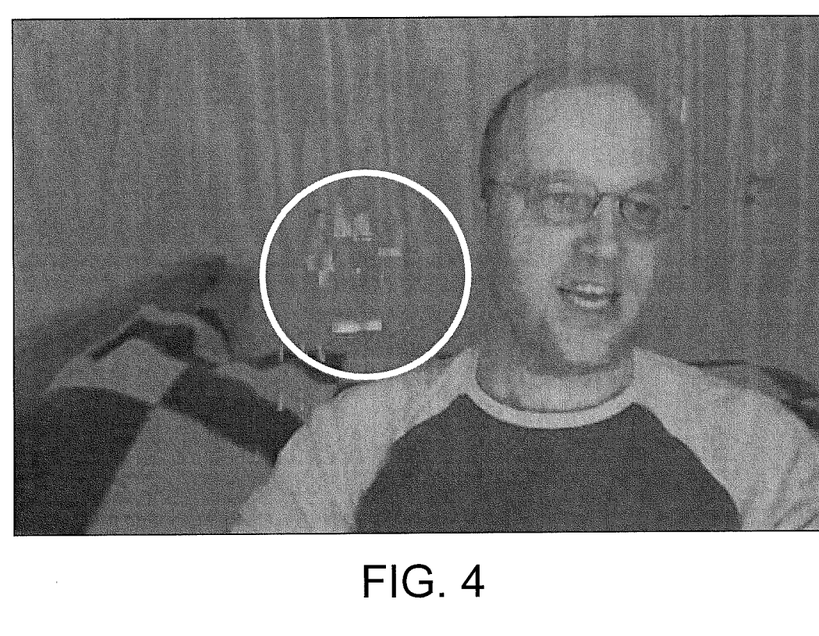
FIG. 4 shows an example of visible artifacts in a decoded video signal.

FIG. 4 shows an example of typical remaining artifacts after frame/slice losses using the algorithm by Zhang et al. The expected potential error-propagation distortion from (3) in the region marked by the circle was not high enough to trigger ultra coding and as a result artifacts will remain present until next intra frame or scene change. Instead, if the potential error-propagation is integrated over time it is likely that an intra coding will be triggered and the remaining artifacts vanish over time. An example embodiment of how this can be implemented is presented in the next section.

A particular embodiment of the invention is based on a modification to the algorithm by Zhang et al. that incorporates temporal integration to the expected error-propagation distortion. It makes the following modification to equation (3) for the update of the error propagated distortion map:

$$D_{ep}(m(k),n+1) = \alpha(1-p)D_{ep-ref}(m(k),n,o_{opt}) + p(D_{ec-rec}(m(k),n,o_{opt}) + D_{ec-ep}(m(k),n)), \quad (4)$$

where $\alpha$ denotes a temporal integration factor ($\alpha>1$). A sufficiently large factor $\alpha$ and a nonzero $D_{ep-ref}$ results in $D_{ep}$ growing even in conditions where the error concealment reconstruction distortion $D_{ec-rec}$ is zero, and thus, eventually triggering an intra coding. The selection of $\alpha$ is subject to tuning and it could be beneficial to have different values of $\alpha$ for different bitrates and channel conditions.

The encoder is similar to that described in relation to FIG. 3, but with a modified mode selection module 49 configured to integrate the effect of distortion over time. It may be used to encode a video stream of the kind illustrated FIG. 1, and implemented in a communication system such as that of FIG. 2.

The meaning of equation (4) and the temporal integration factor $\alpha$ will now be discussed in more detail.

As mentioned, mode selection may involve optimizing (e.g. minimizing) a Lagrangian type function:

$$J = D(m,o) + \lambda R(m,o), \quad (1)$$

where J represents the Lagrange function, D represents a measure of distortion (a function of mode o and macroblock m or macroblock sub-partition), R is the bitrate, and $\lambda$ is a parameter defining a trade-off between distortion and rate.

In a conventional case the distortion term D only takes into account the source coding distortion, i.e. due to imperfections in the encoder such as the distortion introduced by quantization. It does not take into account the distortion that may be introduced due to loss of data over the channel, e.g. due to packet loss in transmission over a packet-based network 32.

On the other hand, loss adaptive techniques such as those of the present invention and Zhang et al. attempt to define a measure of "end-to-end" distortion taking into account both the source encoding and the distortion due to loss of data over the channel. The end-to-end distortion for a given (target) block may be described as:

$$D = (1-P)D_{arrival} + pD_{loss} \quad (5)$$

Where $D_{arrival}$ is an estimate of the distortion that will be experienced if the target block does arrive at the decoder, and $D_{loss}$ is an estimate of the distortion that will be experienced if the target block does not arrive at the decoder due to packet loss over the channel, e.g. due to loss of a packet comprising that block over a packet-based network 32. The parameter p is an estimate of the probability of a loss event occurring over the channel that results in the block in question being lost, e.g. an estimate of the probability of a packet loss.

$D_{arrival}$ represents not only the source coding distortion but also the distortion that will be introduced due to distortion of a block's past, i.e. distortion in one or more reference blocks from which the target block is to be predicted. Therefore $D_{arrival}$ comprises both a source coding distortion term $D_s$ and an error propagation distortion term $D_{ef-ref}$ which represents a distortion in the predicted target block's history (i.e. distortion in the target blocks' reference block which will carry forward into the target block):

$$D_{arrival} = D_s + D_{ep-ref} \quad (6)$$

$D_{loss}$ comprises a loss due to concealment. If a target block is not received then the decoder will apply a concealment algorithm which could involve freezing a previously decoded block, or interpolating or extrapolating from one or more successfully decoded blocks (either from the current frame and/or a previous frame). Therefore $D_{loss}$ can be identified as the distortion due to this concealment process:

$$D_{loss} = D_{ec} \quad (7)$$

So examining equation (5), the term $D_s$ represents an estimate of the distortion that will be experienced if there is no loss at all, the term $D_{ec}$ represents an estimate of the an estimate of the distortion that will be experienced if the target block is lost, and the term $D_{ep-ref}$ represents an estimate of the distortion that will be experienced if the target block is successfully received but something in its history is lost (if the target block's reference block is lost, or the reference block's reference block is lost, etc.)

$D_s$ and $D_{ep-ref}$ are functions of encoding mode selection o. $D_{ec}$ is not a function of mode selection o and so is dropped from the Lagrange expression (it does not matter how a lost block was encoded—it is still lost). Hence the optimization can be written as:

$$o_{opt} = \underset{o}{\arg\min}(D_s(m,o) + D_{ep-ref}(m,o) + \lambda R(m,o)), \quad (2)$$

$D_s$ is deterministic as it is based on information that can be known at the encoder, for example based on the difference between the raw input samples values s and the reconstructed sample values $\hat{s}$. The encoder runs a parallel instance of the decoder at the encoder side (or an approximation of it)—see the inset detailing the inter prediction module 43 in FIG. 3. The inter prediction module 43 comprises a motion compensation prediction (MCP) block 44 and addition stage (+) arranged to determine the reconstructed samples $\hat{s}$ by combining the predicted samples $\hat{s}_{pred}$ and the reconstructed residual $\hat{r}$, i.e. $\hat{s}_i = \hat{r}_i + \hat{s}_{pred}$ for each sample index i. In the case of inter encoding, at the encoder the predicted samples $\hat{s}_{pred}$ may be the same as the samples of the reference block $\hat{s}_{ref}$ (the reference block in the reference frame just being offset by the motion vector relative to the target frame—see FIG. 1c, to be discussed again shortly).

Hence the encoder can determine the difference between the actual samples s and the reconstructed samples $\hat{s}$ as seen at the encoder and (this so far ignores the possibility of loss which will introduce further distortion experienced at the decoder). The difference in samples may be calculated for example as the sum square difference (SSD) error over all sample indices i of the target block in question:

$$D_s = \sum_i [(s_i - \hat{s}_i)^2] \quad (8)$$

However, $D_{ep\text{-}ref}$ remains to be estimated, which will be based on making some estimation concerning the channel over which the encoded data is to be transmitted (e.g. over packet-based network 32).

To achieve this, the mode selection module 49 in the encoder may be configured to maintain an error propagation distortion map $D_{ep}$, describing the distortion of each macroblock or partition of a macroblock within the most recently encoded frame. The mode selection module 49 is also arranged to determine a probability p that the packet containing the reference block from which a target block is to be predicted will be lost over the channel (and therefore also to implicitly or explicitly determine a probability 1−p that the packet does arrive). In a preferred embodiment the probability p is predetermined at the design stage based on statistical modeling, in which case the mode selection module 49 determines p by retrieving a value from memory 14. However, another possibility would be that the mode selection module 49 determines p based on feedback from the receiver 22.

The error propagation map may be expressed as:

$$D_{ep} = (1-p)D_{ep\text{-}arrival} + pD_{loss} \quad (9)$$

The error propagation map $D_{ep}$ comprises a distortion estimate for macroblock m or more preferably for each sub partition (block) m(k) within the most recently encoded frame. Hence it may be more explicitly written as:

$$D_{ep}(m(k)) = (1-p)D_{ep\text{-}arrival}(m(k)) + pD_{loss}(m(k)) \quad (10)$$

where m(k) denotes the $k^{th}$ sub-partition (e.g. block) of macroblock in and p the probability of packet loss.

$D_{loss}$ is equal to $D_{ec}$ as discussed above. $D_{ep\text{-}arrival}$ represents the differences over the channel, i.e. the difference between the reconstructed samples at the encoder and the reconstructed at the decoder. For example this could be quantified in terms of the sum of squared differences (SSD):

$$D_{ep\text{-}arrival} = \sum_i (\hat{s}_i - \tilde{s}_i)^2 \quad (11)$$

Where $\tilde{s}_i$ are the samples (of indices i) received at the decoder taking into account both the source coding distortion and the distortion due to the channel. I.e. $s_i$ are the raw unencoded input samples, $\hat{s}_i$ are the reconstructed samples at the encoder taking into account the source coding distortion (e.g. due to quantization), and $\tilde{s}_i$ are the samples taking into account the total end-to-end distortion including the lossy effect of the channel; $s_i \rightarrow \hat{s}_i \rightarrow \tilde{s}_i$.

$D_{ep\text{-}arrival}$ can be expanded to:

$$D_{ep\text{-}arrival} = \sum_i ((\hat{s}_{ref} + \hat{r}_i) - (\tilde{s}_{ref} + \hat{r}_i))^2 \quad (12)$$

where $\hat{r}_i$ are the samples of the reconstructed residual. Therefore:

$$D_{ep\text{-}arrival} = \sum_i (\hat{s}_{ref} - \tilde{s}_{ref})^2 = D_{ep\text{-}ref} \quad (13)$$

So substituting into equations (9) and (1), the error propagation map can be rewritten as:

$$D_{ep} = (1-p)D_{ep\text{-}ref} + pD_{ec} \quad (14)$$

or:

$$D_{ep}(m(k)) = (1-p)D_{ep\text{-}ref}(m(k)) + pD_{ec}(m(k)) \quad (15)$$

Considering the mode optimization problem, it may also be written:

$$D_{ep}(m(k), n+1) = (1-p)D_{ep\text{-}ref}(m(k), n, o_{opt}) + pD_{ec}(m(k), n, o_{opt}) \quad (16)$$

where n is the frame number, i.e. $D_{ep}(n+1)$ is the error propagation map to be used for making the mode selection for frame number n+1 given the existing decision $o_{opt}$ and distortion $D_{ep}(n)$ map for frame n.

As in Zhang et al., the $D_{ec}$ term may be also expanded:

$$D_{ep}(m(k), n+1) = (1-p)D_{ep\text{-}ref}(m(k), n, o_{opt}) + p(D_{ec\text{-}rec}(m(k), n, o_{opt}) + D_{ec\text{-}ep}(m(k), n)), \quad (3)$$

where $D_{ec\text{-}rec}$ denotes the SSD between the reconstructed and error concealed pixels in the encoder, and $D_{ec\text{-}ep}$ the expected SSD between the error concealed pixels in the encoder and decoder.

Examining equation (3), as explained above, the term $D_{ep\text{-}ref}$ represents the distortion that will be experienced if the target block is successfully received but something in its history is lost (if the target block's reference block is lost, or the reference block's reference block is lost, etc.). Further, $D_{ec\text{-}rec}$ represents an estimate of the distortion due to the nature of the concealment algorithm itself (somewhat analogous to the intrinsic source coding distortion $D_s$ for prediction). $D_{ec\text{-}ep}$ then represents an estimate of the distortion that will be experienced if both the target block is lost (and so needs to be concealed at the decoder) and something in the concealed target block's history is lost (if the block from which concealment is done is lost, or the block from which that block is predicted or concealed is lost, etc.).

So the distortion map $D_{ep}$ comprises a contribution due to new loss, resulting from $D_{ec\text{-}rec}$ and in part from $D_{ec\text{-}ep}$; and a contribution due to past loss, resulting from $D_{ep\text{-}ref}$ and in part also from $D_{ec\text{-}ep}$.

For the first frame in a sequence the frame will be coded with intra coding, in which case $D_{ep\text{-}ref} = 0$ and therefore $D_{ep} = pD_{ec}$.

The error concealment distortion $D_{ec}$ is calculated by the mode selection module 49. The term $D_{ec\text{-}rec}$ is based on knowledge of the concealment algorithm, and may depend on the particular error concealment algorithm used. $D_{ec\text{-}ep}$ is calculated based on the existing (most recent) distortion map in a manner analogous to $D_{ep\text{-}ref}$, e.g. by copying the distortion of a co-located block in the case of a basic concealment algorithm or calculating a weighted sum of the distortions from multiple previously encoded blocks b1-b4 if a more sophisticated concealment is used that attempts to extrapolate motion (by analogy see discussion in relation to FIG. 1c below). Other ways of calculating $D_{ec}$ could be used—this could be any estimation of a difference between the reconstructed samples in the encoder and the error concealed samples as would be seen ay the decoder (i.e. the samples copied, interpolated or extrapolated from a previous received frame or a received region of the same frame to conceal the lost frame or region).

The mode selection module 49 then maintains the error propagation map for each subsequent inter predicted frame by updating it following each mode selection decision, now including a calculation of $D_{ep\text{-}ref}$ from knowledge of the existing error map using the motion vectors for the frame in question.

Figure 1C:
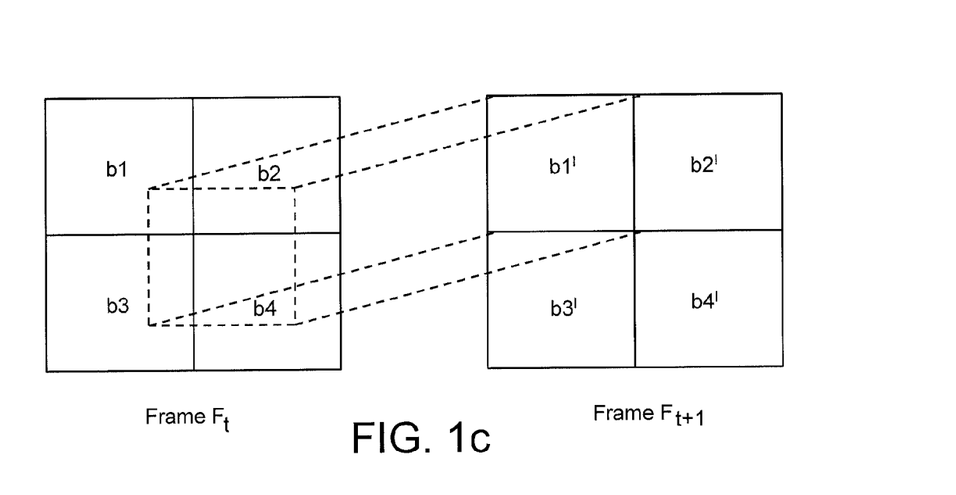
FIG. 1c is a schematic representation of an inter prediction coding mode.

An example of inter prediction (motion estimation) is illustrated in FIG. 1c. Four example blocks b1, b2, b3 and b4 are shown in a reference frame $F_t$ (number n), the reference frame having already been encoded. The blocks of the target frame $F_{t+1}$ (number n+1) are to be predicted from the reference frame $F_t$. For example consider a target block $b_1'$ in the target frame $F_{t+1}$. To this end the motion prediction module 44 determines a motion vector defining an offset between the target block in the target frame $F_{t+1}$ and a reference block (shown by the dotted line) in the reference frame $F_t$, such that when the reference block is translated from the offset position in the reference frame $F_t$ into the position of the target block $b_1'$ in the target frame $F_{t+1}$ it provides a best estimate of the target block $b_1'$. Note therefore that the dotted reference block is not necessarily an indexable block in the reference frame $F_t$, i.e. is not necessarily a predetermined subdivision of the reference frame, and may be offset by any arbitrary amount (and in fact may even be offset by a fractional number of pixels). Hence the reference block is made up of a contribution from four actual indexable blocks b1, b2, b3 and b4.

Accordingly, the calculation performed by the mode selection module 49 to determine $D_{ep\text{-}ref}$ for use in the update of the error propagation map $D_{ep}(n+1)$ comprises calculating a weighted sum of the distortions recorded for blocks b1 to b4 in the existing map $D_{ep}(n)$:

$$D_{ep-ref} = \sum_{i=1}^{4} w_i D_{ep}(i) \tag{17}$$

where $w_i$ is the weight representing the contribution from block $b_i$ and $D_{ep}(i)$ is the error propagation map entry for block $b_i$.

The above describes a process of determining an initial error propagation map $D_{ep}$, using the error propagation map to select an optimal coding mode decision $o_{opt}$ for a subsequent coding, using the coding decision to update the map $D_{ep}$, then using the updated map in the next coding decision, and so forth, wherein the error propagation map represents an end-to-end distortion including an estimated effect of loss over the channel. E.g. reference is made again to Zhang et al. This may be referred to herein as loss-adaptive rate-distortion optimization (LARDO).

However, there is a problem with existing LARDO techniques in that they do not take into account the impact of past distortion due to loss propagating into the future, particularly in circumstances where there is little or no motion such as a static background or approximately static background. In such circumstances the inventors have noted that:

$$D_{ec-rec} \approx 0 \tag{18}$$

In a basic concealment algorithm this is because the concealed block is copied from a preceding co-located block, and in the case of a static background the preceding co-located block will be the same as the current concealed block. That is, the error concealed and reconstructed samples in the encoder will be the same; or put another way, the concealment algorithm itself does not intrinsically introduce any distortion. A similar effect will also occur in a more sophisticated concealment algorithm.

Furthermore:

$$D_{ec-ep} \approx D_{ep} \tag{19}$$

This is because, in absence of any intrinsic distortion from the concealment, the difference between the error concealed samples at the encoder and those as estimated to be seen at the decoder will only be copied from the existing error propagation map.

Substituting (18) and (19) into equation (3), it can be seen that this means:

$$D_{ep}(n+1) \approx (1-p)D_{ep}(n) + pD_{ep}(n) \approx D_{ep}(n) \tag{20}$$

That is, in circumstances where the contribution from new loss is zero or negligible, the updated propagation map reduces to a contribution only from past loss (loss in the history used for prediction and/or concealment). Looked at another way, in the case of little or no motion, e.g. a substantially static background, the effect of any further loss over a channel and the associated concealment at the decoder will in itself have no intrinsic effect on the distortion, because a block copied or extrapolated from one frame to the next should in principle be identical (or in the case of a spatial concealment algorithm, a block which is copied, extrapolated or interpolated from one or more nearby blocks of a large, static region of uniform background will be very similar). The result is that $D_{ep}$ will remain the same indefinitely and not grow over time.

However, in reality the distortion will become increasingly relevant from a perceptual point of view, because the duration of an error is important in the perception of the error. That is to say, it is not just the magnitude of distortion that is relevant from a perceptual point of view, but also its duration.

A problem therefore exist in that, using existing techniques such Zhang et al., the distortion map which forms a basis for the making coding mode decisions will not always trigger intra coding early enough to prevent perceptually relevant artifacts. E.g. see the circled region in FIG. 4.

In Zhang [2] the error propagation map may increase over time, but only due to a contribution to the distortion that arises from continued ongoing loss over the channel, i.e. only due to new loss and associated concealment.

To address this problem, the present invention proscribes the use of an error propagation map which, in circumstances such as a static background where the contribution from new loss is zero or negligible, reduces to an expression which accumulates the contribution from past loss into the future:

$$D_{ep}(n+1) = \alpha D_{ep}(n) \tag{21}$$

where $\alpha > 1$. This may be considered as a temporal integration of the contribution from past loss over time.

For example, modifying Zhang et al. the formula for the distortion map would become:

$$D_{ep}(m(k),n+1) = \alpha(1-p)D_{ep\text{-}ref}(m(k),n,o_{opt}) + P(D_{ec-rec}(m(k),n,o_{opt}) + D_{ec-ep}(m(k),n)), \tag{4}$$

where $\alpha > 1$. As mentioned, a sufficiently large factor $\alpha$ and a nonzero $D_{ep\text{-}ref}$ will result in $D_{ep}$ growing even in conditions where the error concealment reconstruction distortion $D_{ec-rec}$ is zero, and thus, eventually triggering an intra coding.

That is, the effect of historical loss is amplified increasingly as more time passes, giving this distortion a greater weight in the optimization problem. Even if the actual distortion estimated in terms of difference between samples is not necessarily growing, the perception of the distortion becomes more significant with time and so older distortion should be given a greater weight when choosing whether to use inter or intra coding to encode the next frame or region.

The parameters λ and α above may be tuned by the system designer. There is no right or wrong value for these parameters—the preferred values will depend on the particular quality the system designer decides to tolerate and the bitrate that can be supported by the channel. By way of example, in one embodiment α may be in the range 1.003 to 1.005. A particular value of λ is suggested by H.264 though this may also be tuned according to system design.

In a particularly beneficial embodiment, the mode selection module 49 may be configured to use different values of α may be used for different bitrates and/or channel conditions. In this case α may be adapted dynamically based on the currently detected channel condition(s), e.g. as reported in feedback from the decoder; and/or based on a dynamic setting or change of bitrate, e.g. based on a requested bitrate from the decoder or based on a user setting.

Note again that where a contribution due loss is mentioned in this application, or anything stating what happens "if" data lost over the channel or such like, this only relates to a probabilistic assumption (e.g. p) made by the encoder about what might be experienced by the decoder—the encoder of course does not know what will happen. The probabilistic assumption may be predetermined at the design stage based on statistical network modeling, and/or could even be determined dynamically based on feedback from the decoder.

It will be appreciated that the above embodiments have been described only by way of example.

While the above has been described in terms of slices, macroblocks and blocks, these terms are not intended to be limiting and the ideas described herein are not limited to any particular way of dividing or subdividing a claim. Further, the distortion map may cover a whole frame or a region within a frame, and coding decision process may be applied over the whole frame or only for a region within a frame.

The sum of squared differences (SSD) is often preferred as measure of difference since it results in higher quality compared to sum of absolute differences (SAD), but the latter possibility or other possibilities are not excluded and generally the invention could be implemented using any measure of difference between samples as a basis for quantifying distortion.

Commonly, the measure of rate also accounts for coding of all needed parameters, including parameters describing prediction and quantized transform coefficients. This kind of optimization may be referred to herein as full rate-distortion optimization (RDO) [4]. In lower complexity embodiments however, the distortion and/or rate term may be approximated by only taking into account the effect of some but not all processing stages, e.g. only taking into account the effect of prediction.

Further, where the present invention is described in terms of two frames n and n+1, according to certain embodiments of the invention it is not necessary for these to refer to two adjacent frames (though that may be the case in existing codecs). In some embodiments it is possible that inter prediction could be performed relative to an even earlier frame, and as such n and n+1 may be used in relation to the present invention to refer respectively to any previously encoded frame or image portion and a subsequent frame or portion to be predicted from it.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

It should be understood that elements of the block, flow, and network diagrams described above may be implemented in software, hardware, or firmware. In addition, the elements of the block, flow, and network diagrams described above may be combined or divided in any manner in software, hardware, or firmware. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth. In operation, a general purpose or application specific processor loads and executes the software in a manner well understood in the art.

Other variants may become apparent to a person skilled in the art given the disclosure herein. The scope of the invention is not limited by the described embodiments but only by the appendant claims.

What is claimed is:

1. A method of encoding a video stream comprising a plurality of frames, each frame comprising a plurality of image portions, the method comprising:

for each target image portion to be encoded, selecting a preferred one of a set of encoding modes by optimizing a function comprising an estimate of distortion and a measure of bit rate required to encode the target image portion, the encoding modes comprising at least an intra frame mode which encodes the target image portion relative to a reference image portion in the same frame, and an inter frame encoding mode which encodes the target image portion relative to a reference image portion in a previously encoded frame, the estimate of distortion being based on a contribution from possible loss over a channel comprising possible loss of the target block, and on a contribution from possible past loss over the channel comprising possible loss in a history of the encoded video stream upon which decoding of the target image portion depends;

encoding the target image portion into the encoded video stream using the selected encoding mode; and transmitting the encoded video stream over the lossy channel;

accumulating the contribution from past loss over time, such that the estimate of distortion grows irrespective of the contribution from new loss, the estimate of distortion comprising a bias term representing an estimate of distortion that would be experienced due to loss over the channel, the bias term being based on the contributions from possible new and past loss, on a second term representing an estimate of the distortion that would be experienced, if the target image portion arrives over the channel, due to non arrival of a reference portion in the target image portion's history from which prediction of the target image portion depends, and on a concealment term representing an estimate of distortion that would be experienced due to concealment;

applying a temporal integration factor to the second term of the accumulated contribution;

updating an error propagation distortion map after each encoding mode selection; and determining the error propagation bias term from the error propagation distortion map for use in each respective subsequent encoding mode selection, the bias term being based on an entry in the error propagation distortion map comprising the second term and the concealment term.

2. The method of claim 1, wherein the estimate of distortion further comprises a first term representing source coding distortion.

3. The method of claim 2, wherein the concealment term comprises a third term representing a measure of concealment distortion of the target portion relative to an image portion that would be used to conceal loss of the target portion if the target portion is lost over the channel, and a fourth term representing an estimate of distortion that would be experienced due to loss of an image portion in the target portion's history upon which concealment of the target portion depends.

4. The method of claim 3, wherein the contribution from new loss results from the third term and fourth term, and the contribution from past loss results from the second term and fourth term.

5. The method of claim 1, comprising determining a probability p that a packet will be lost over the channel, wherein the second term is weighted by a factor of 1−p, the concealment term is weighted by a factor of p, and the second term is further weighted by the temporal integration factor such that the second term is weighted by a combined factor greater than 1−p.

6. The method of claim 1, wherein the selected encoding mode $o_{opt}$ is calculated by:

$$o_{opt} = \mathrm{argmin}_o(D_s(m, o) + D_{ep-ref}(m, o) + \lambda R(m, o)),$$

where $D_s(m,o)+D_{ep-ref}(m,o)+\lambda R(m,o)$ is said function, $D_s$ is the first term, $D_{ep-ref}(m,o)$ is the bias term, R(o) is the bitrate, $\lambda$ is a factor representing a trade-off between distortion and bitrate, and m is an index of the target image portion.

7. The method of claim 1, wherein the updated distortion map $D_{ep}$ for a frame n+1 is configured so as to tend towards:

$$D_{ep}(n+1)=\alpha D_{ep}(n)$$

as the contribution from new loss tends towards zero, where $\alpha$ is the temporal integration factor, and n is a previously encoded frame for which the distortion map has already been determined.

8. The method of claim 4, wherein:

$$D_{ep}(m(k),n+1)=\alpha(1-p)D_{ep-ref}(m(k),n,o_{opt})+ \\ p(D_{ec-rec}(m(k),n,o_{opt})+D_{ec-ep}(m(k),n))$$

where m(k) is the $k^{th}$ partition of the $m^{th}$ image portion, $D_{ep-ref}$ the second term, $D_{ec-rec}$ is the third term, and $D_{ec-ep}$ is the fourth.

9. The method of claim 1, wherein the set of encoding modes comprises a skip mode.

10. The method of claim 1, wherein the set of encoding modes comprises modes using different sub-partitions of the target image portion for at least one of intra and inter frame encoding.

11. An apparatus for encoding a video stream comprising a plurality of frames, each frame comprising a plurality of image portions, the apparatus comprising:
an encoder configured to:
for each target image portion to be encoded, to select a preferred one of a set of encoding modes by optimizing a function comprising an estimate of distortion and a measure of bit rate required to encode the target image portion, the encoding modes comprising at least an intra frame mode which encodes the target image portion relative to a reference image portion in the same frame, and an inter frame encoding mode which encodes the target image portion relative to a reference image portion in a previously encoded frame, the estimate of distortion being based on a contribution from possible loss over a channel comprising possible loss of the target block, and on a contribution from possible past loss over the channel comprising possible loss in a history of the encoded video stream upon which decoding of the target image portion depends;
encode the target image portion into the encoded video stream using the selected encoding mode;
the apparatus further comprises a transmitter for transmitting the encoded video stream over a lossy channel;
the encoder is further configured to:
accumulate the contribution from past loss over time, such that the estimate of distortion grows irrespective of the contribution from new loss, the estimate of distortion comprising a bias term representing an estimate of distortion that would be experienced due to loss over the channel, the bias term being based on the contributions from possible new and past loss, on a second term representing an estimate of the distortion that would be experienced, if the target image portion arrives over the channel, due to non arrival of a reference portion in the target image portion's history from which prediction of the target image portion depends, and on a concealment term representing an estimate of distortion that would be experienced due to concealment;
apply a temporal integration factor to the second term of the accumulated contribution;
update an error propagation distortion map after each encoding mode selection; and
determine the error propagation bias term from the error propagation distortion map for use in each respective subsequent encoding mode selection, the bias term being based on an entry in the error propagation distortion map comprising the second term and the concealment term.

12. The apparatus of claim 11, wherein the estimate of distortion further comprises a first term representing source coding distortion.

13. The apparatus of claim 12, wherein the concealment term comprises a third term representing a measure of concealment distortion of the target portion relative to an image portion that would be used to conceal loss of the target portion if the target portion is lost over the channel, and a fourth term representing an estimate of distortion that would be experienced due to loss of an image portion in the target portion's history upon which concealment of the target portion depends.

14. The apparatus of claim 13, wherein the contribution from new loss results from the third term and fourth term, and the contribution from past loss results from the second term and fourth term.

15. The apparatus of claim 11, wherein the second term is weighted by a factor of 1−p, the concealment term is weighted by a factor of p, and the second term is further weighted by the temporal integration factor such that the second term is weighted by a combined factor greater than 1−p, where p represents a probability that a packet will be lost over the channel.

16. The apparatus of claim 14, wherein:

$$D_{ep}(m(k),n+1)=\alpha(1-p)D_{ep\text{-}ref}(m(k),n,o_{opt})+p(D_{ec\text{-}rec}(m(k),n,o_{opt})+D_{ec\text{-}ep}(m(k),n))$$

where m(k) is the $k^{th}$ partition of the $m^{th}$ image portion, $D_{ep\text{-}ref}$ the second term, $D_{ec\text{-}rec}$ is the third term, and $D_{ec\text{-}ep}$ is the fourth.

17. The apparatus of claim 11, wherein the set of encoding modes comprises a skip mode.

18. The apparatus of claim 11, wherein the set of encoding modes comprises modes using different sub-partitions of the target image portion for at least one of intra and inter frame encoding.

19. A system comprising:
one or more processors; and
a memory comprising instructions for encoding a video stream comprising a plurality of frames, each frame comprising a plurality of image portions, the instructions executable by the one or more processors to perform operations comprising:
for each target image portion to be encoded, selecting a preferred one of a set of encoding modes by optimizing a function comprising an estimate of distortion and a measure of bit rate required to encode the target image portion, the encoding modes comprising at least an intra frame mode which encodes the target image portion relative to a reference image portion in the same frame, and an inter frame encoding mode which encodes the target image portion relative to a reference image portion in a previously encoded frame, the estimate of distortion being based on a contribution from possible loss over a channel comprising possible loss of the target block, and on a contribution from possible past loss over the channel comprising possible loss in a history of the encoded video stream upon which decoding of the target image portion depends;
encoding the target image portion into the encoded video stream using the selected encoding mode; and
transmitting the encoded video stream over the lossy channel; accumulating the contribution from past loss over time, such that the estimate of distortion grows irrespective of the contribution from new loss, the estimate of distortion comprising a bias term representing an estimate of distortion that would be experienced due to loss over the channel, the bias term being based on the contributions from possible new and past loss, on a second term representing an estimate of the distortion that would be experienced, if the target image portion arrives over the channel, due to non arrival of a reference portion in the target image portion's history from which prediction of the target image portion depends, and on a concealment term representing an estimate of distortion that would be experienced due to concealment;
applying a temporal integration factor to the second term of the accumulated contribution;
updating an error propagation distortion map after each encoding mode selection; and
determining the error propagation bias term from the error propagation distortion map for use in each respective subsequent encoding mode selection, the bias term being based on an entry in the error propagation distortion map comprising the second term and the concealment term.

20. The system of claim 19, wherein the estimate of distortion further comprises a first term representing source coding distortion.

21. The system of claim 20, wherein the concealment term comprises a third term representing a measure of concealment distortion of the target portion relative to an image portion that would be used to conceal loss of the target portion if the target portion is lost over the channel, and a fourth term representing an estimate of distortion that would be experienced due to loss of an image portion in the target portion's history upon which concealment of the target portion depends.

22. The system of claim 21, wherein the contribution from new loss results from the third term and fourth term, and the contribution from past loss results from the second term and fourth term.

23. The system of claim 22, wherein:

$$D_{ep}(m(k),n+1)=\alpha(1-p)D_{ep\text{-}ref}(m(k),n,o_{opt})+p(D_{ec\text{-}rec}(m(k),n,o_{opt})+D_{ec\text{-}ep}(m(k),n))$$

where $m(k)$ is the $k^{th}$ partition of the $m^{th}$ image portion, $D_{ep\text{-}ref}$ the second term, $D_{ec\text{-}rec}$, is the third term, and $D_{ec\text{-}ep}$ is the fourth.

24. The system of claim 19, wherein the instructions are configured to determine a probability p that a packet will be lost over the channel, wherein the second term is weighted by a factor of 1−p, the concealment term is weighted by a factor of p, and the second term is further weighted by the temporal integration factor such that the second term is weighted by a combined factor greater than 1−p.

25. The system of claim 19, wherein the set of encoding modes comprises a skip mode.

26. The system of claim 19, wherein the set of encoding modes comprises modes using different sub-partitions of the target image portion for at least one of intra and inter frame encoding.

* * * * *